United States Patent [19]

Dunning et al.

[11] 3,949,139

[45] Apr. 6, 1976

[54] LAMINAR REFLECTIVE PLATELETS AND COMPOSITIONS AND ARTICLES COMPRISING THEM

[75] Inventors: Richard E. Dunning, Munster, Ind.; Victor H. Rampelberg, Flossmoor, Ill.

[73] Assignee: Avery Corporation, San Marino, Calif.

[22] Filed: Jan. 25, 1974

[21] Appl. No.: 436,676

Related U.S. Application Data

[62] Division of Ser. No. 225,188, Feb. 10, 1972, abandoned.

[52] U.S. Cl. ................ 428/328; 428/332; 428/336; 428/457; 428/458; 428/463; 428/480; 428/535; 428/536; 428/913; 428/914; 428/483; 428/508; 428/511; 106/290; 106/291

[51] Int. Cl.²... B32B 5/16; B32B 15/20; C09C 1/64

[58] Field of Search........ 161/165, 406 T, 406, 410, 161/213, 214, 216, 4, 162; 117/3.3; 428/914, 913, 457, 458, 463, 328, 332, 339, 336, 480, 535, 536, 483, 508, 511; 106/290, 291

[56] References Cited

UNITED STATES PATENTS

| | | | |
|---|---|---|---|
| 2,839,378 | 6/1958 | McAdow | 117/107 |
| 2,993,806 | 7/1961 | Fisher | 117/107 |
| 3,107,198 | 10/1963 | Amborski | 161/213 |
| 3,235,395 | 2/1966 | Scharf | 117/3.3 |
| 3,480,500 | 11/1969 | Hotler | 161/406 |
| 3,666,516 | 5/1972 | Dunning | 117/3.4 |
| 3,677,792 | 7/1972 | Best | 161/213 |
| 3,697,070 | 10/1972 | McAdow | 117/107 |

*Primary Examiner*—George F. Lesmes
*Assistant Examiner*—Ellis P. Robinson
*Attorney, Agent, or Firm*—Christie, Parker & Hale

[57] ABSTRACT

Laminar reflective platelets are made by coating a first synthetic resin lamina on a carrier web and providing release means such as a release coat to provide for release of the lamina. A metallic lamina is coated onto the synthetic resin lamina by vapor deposition in vacuum and a third optional synthetic resin lamina may then be coated onto the metal layer. Each of the three laminae has a thickness on the order of one to 3 millionths of an inch. The thus-coated web is immersed in a releasing solvent to activate the release means. The laminate is removed from the carrier by reason of solution or partial solution of the release coat or release means in the solvent. Removal may be aided by mechanical means such as brushing or scraping. The solvent is agitated to reduce the laminar platelets to final size. Laminar platelets thus formed have a thickness of from 0.5 to 5 millionths of an inch; each has a diffuse reflectance of from 75 to 95%, and 90 to 100% pass through a 300 mesh screen. Concentration of the laminar platelets in the solvent may be increased to 50 to 80% as by decantation. Highly reflective sprayable coatings such as lacquers and enamels may be made therefrom.

Weatherable, abrasion-resistant, highly reflective, extremely economical thermally transferable web, commonly referred to as hot stamp tape, is made as a laminate comprising a lamina comprising such platelets and an opaque lamina comprising conventional aluminum pigment and optionally a third lamina comprising a protective coating consisting essentially of methyl methacrylate.

9 Claims, 8 Drawing Figures

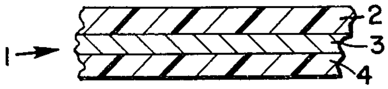
Fig. 1.
Fig. 2.
Fig. 3.
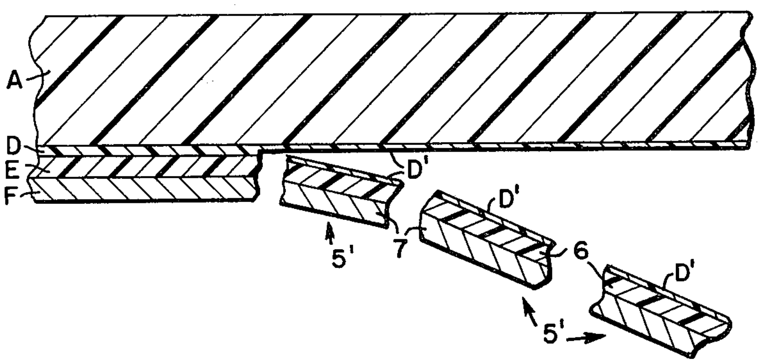
Fig. 4.
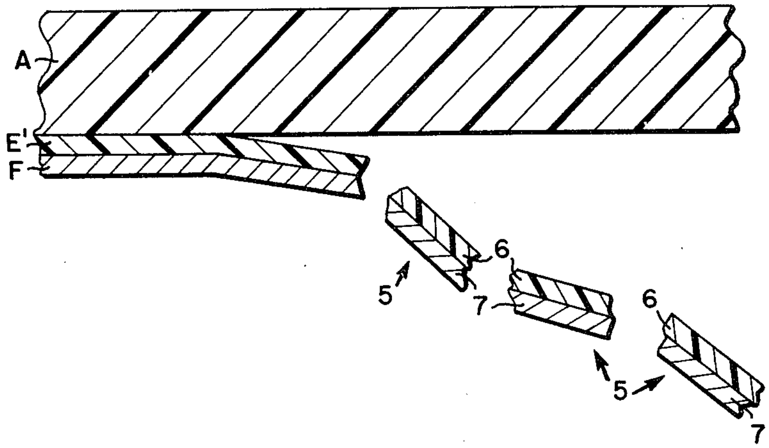

LAMINAR REFLECTIVE PLATELETS AND COMPOSITIONS AND ARTICLES COMPRISING THEM

This is a division of application Ser. No. 225,188 now abandoned, filed Feb. 10, 1972.

CROSS-REFERENCES

FIELD

This invention relates to reflective laminar platelets comprising metal, to method of making same and to compositions and articles comprising same.

PRIOR ART

This invention is an improvement on the disclosures of the following U.S. Patents:

| U. S. Patent No: | Patentee | Classification |
|---|---|---|
| 2,839,378 | McAdow | 75–5 |
| 2,941,894 | McAdow | 106–193 |
| 3,252,847 | Morgan et al | 156–233 |

We have found that particles prepared in accordance with the disclosure of the McAdow patents are not stable and that if particles formed in accordance with the process disclosed therein, they are either comminuted or agglomerated or collapsed. In any event, the usual product obtained is not as described therein, but, on the other hand, is a grey mass of extremely small particles. A coating made of said particles has almost no diffuse reflectance (under 5%) and has neither the properties of reflectivity nor transmittance of light described in those patents. The particles do not generally have the form of platelets.

SUMMARY

We have discovered that laminar platelets may be provided which have, in themselves, superior reflectivity, weather-ability, abrasion-resistance and strength.

Laminar platelets in accordance with the invention comprise at least one and often two laminae of synthetic resinous material and one lamina of metal. In embodiments comprising two synthetic resinous lamina, the metal lamina is between them. The metal lamina, in contradistinction to the metal platelet described by McAdow, usually and preferably has a thickness of on the order of 0.5 to 1.4 millionth inch and is thus much thinner than any platelet described by McAdow. However, the invention is suitable with metal laminae having greater thicknesses, having a thickness in the range of 0.3 to 3.5 millionths of an inch. Each of the platelets has a total thickness of from 0.0003 to 0.002 inch. Suitable metals include aluminum, gold, copper, titanium, molybdenum, vanadium, cadmium, zinc, tin, nickel, chromium and indium.

Platelets of the invention may be made by providing a release coat on a carrier web, then coating the two or three laminae in succession onto the release coating; the metal lamina being deposited on a synthetic resinous lamina by vapor deposition in vacuum. The first synthetic resinous lamina may be formulated also to provide for release and if so the release coat may be omitted and the lamina coated directly on the carrier web. The resulting laminate is then subjected to the action of a solvent or partial solvent for the release coat or release component in the lamina, together, if desired, with mechanical means such as scrubbing or brushing or scraping to provide a number of laminar platelets in the solvent. These may be reduced in size by agitation of the solvent to introduce shear forces and may be concentrated by decantation or the like to as high as 80% solids.

Sprayable coatings, including lacquers, enamels and the like, may be made utilizing such platelets as the only opaque or covering material therein to provide coatings characterized by high reflectivity combined with high resistance to deterioration.

BACKGROUND

Reflective webs of indeterminate length comprising reflective thermally transferable material, usually referred to as reflective hot stamp tapes, have heretofore been made in either one or two manners: (1) pigmentation has been provided entirely or almost entirely by conventional aluminum pigments or (2) a single continuous coated layer of metal has been incorporated therein, the metal being aluminum in almost every instance and being deposited by vapor deposition in vacuum.

The first has the advantage that it is cheap, abrasion-resistant and weather-resistant, but is lacking in mirror-type or bright reflectivity, having a diffuse reflectance of only about 5% at the maximum. The diffuse reflectance may be as low as 1.7%.

The second, on the other hand, has the advantage that it has higher diffuse reflectance but has the disadvantage that abrasion-resistance is low, even though a protective abrasion-resistant layer by provided; and weatherability is poor. Nonetheless, brightness is high, the diffuse reflectance being as high as 82%.

Both have the advantage of economy.

Attempts to merely utilize particles of McAdow in a hot stamp tape, without more, result in an unsatisfactory tape for the reasons discussed above in connection with the inadequacies of McAdow's particles.

Hot stamp tape may be made (3) with the platelets of the instant invention, in place of the aluminum particles of (1) or the layer of (2). Tape (3) has the advantage of moderately high diffuse reflectance (at least 15% to as high as 35%) coupled with excellent weatherability, excellent abrasion-resistance, excellent storage stability and heat stability and accordingly is believed to be unique, novel and inventive. It is theorized that the uniquely improved properties of (3) over (2) result from the fact that whereas in (2) the metal film is continuously, in (3) the metal component consists of a plurality of metal members separated from one another by reason of each metal member being a lamina in a discrete laminar platelet particle. Thus degradation or deterioration which starts from a nucleus in the metal and spreads rapidly therefrom, spreads easily throughout a large area of the film in a continuous film as in that of (2). Such degradation usually consists of oxidation by oxygen or chlorine which results in the film becoming transparent or translucent and ceasing to be reflective. However, in the structure of the instant invention, it appears that degradation spreading from a single nucleus can only spread through the single platelet particle in which the nucleus is located rather than through a larger area. Thus degradation in (2), spreading from only a few nuclei, can cover a very large area whereas, spreading from the same member of nuclei in (3), will involve only an area equal to the number of platelets containing the nuclei, which is a relatively insignificant area.

Despite these many advantages, tape (3) has the disadvantage that it is enormously expensive due to the very high cost of the platelets and due to the relatively low covering power of the platelets. Due to the many steps necessay to prepare the platelets they cost on the order of 200 to 300 times as much per pound as conventional aluminum pigment. Due to the further fact that a great deal of overlapping of platelets is necessary to provide sufficient coverage, the cost of providing a tape in accordance with (3) is far greater than that of tape (2). Thus, despite the marked advantages of (3), it is unfortunately prohibitively expensive.

However, yet, in accordance with another discovery we have made, we have found that we can provide all of the advantages of (3) at a cost not prohibitively greater than that of (1) or (2), for the same area by providing the structure (4) of the instant invention wherein a hot stamp tape is provided which incorporates optionally and preferably a protective layer together with a critically necessary layer comprising the platelets and a critically necessary underlying layer comprising standard aluminum pigment or equivalent.

OBJECTS

It is therefore an object of the invention to provide improved reflective particles.

Another object is to provide improved reflective sprayable compositions.

Another object is to provide improved reflective hot stamp tape.

Further objects will become apparent from the following description.

DRAWINGS

In the drawings, like reference numerals refer to like parts, and:

FIG. 1 is a much enlarged cross-sectional schematic view of a platelet in accordance with the invention;

FIG. 2 is a much enlarged cross-sectional schematic view of another platelet in accordance with the invention;

FIG. 3 is an enlarged cross-sectional schematic view of one embodiment of a process for preparing platelets in accordance with the invention;

FIG. 4 is an enlarged cross-sectional schematic view of a modification of the embodiment of FIG. 3;

DESCRIPTION

Figure 5:
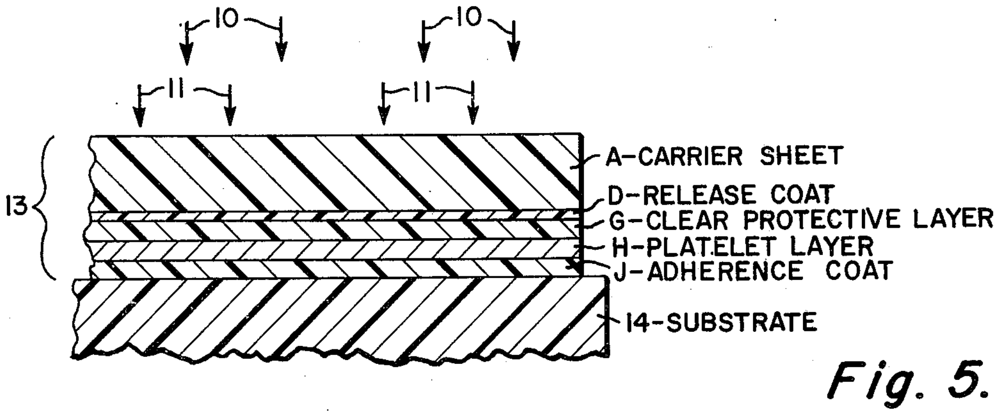
FIG. 5 is a cross-sectional schematic view of one embodiment of the hot stamp tape of the invention.

Referring now to FIG. 1, a laminar platelet indicated generally as 1 is provided comprising synthetic resinous lamina 2, metal (preferably aluminum) lamina 3 and another synthetic resinous lamina 4, which may be of the same composition as lamina 2.

Optionally and preferably, a laminar platelet indicated generally as 5 is provided in accordance with the invention as shown in FIG. 2, wherein platelet 5 comprises synthetic resinous lamina 6 and metal (preferably aluminum) lamina 7.

Referring now to FIG. 3, there is indicated one process of providing platelets 5' corresponding to platelets 5. Carrier sheet or web A is coated with release layer D over which is then coated synthetic resinous layer E and then metal layer F, preferably aluminum, which is preferably coated by evaporation or sputtering in a vacuum. When the thus-coated web is exposed to a suitable solvent for the release coat, the solvent not being shown for simplicity, and, if desired, mechanical action such as brushing, platelets 5' are separated from carrier sheet A. Residual portions of release coat D may remain adhered to carrier sheet A and to platelets 5' if not fully dissolved, as indicated at D'.

Referring now to FIG. 4, there is indicated another process of providing platelets in accordance with the invention, such as platelets 5. Carrier sheet A is coated with synthetic resinous layer E' which comprises means to provide for release of layer E' from carrier sheet A. Layer E' is coated with layer F of metal, in the same manner as described in conjunction with FIG. 3. When the thus coated web is exposed to a solvent which acts suitably on layer E' and, if desired, mechanical force is applied, as by brushing, platelets 5 are separated from carrier sheet A.

Specific examples in which specific components are set forth are presented in tabular form below. Material suitable for carrier sheet material is described hereinafter and is not set forth in the examples.

Table I

| Coat | Example A | B | C | D | E | F | G |
|---|---|---|---|---|---|---|---|
| D-release-composition set forth below in example No. | 1 | 1 | 3 | 4 | 4 | 9 | 9 |
| E and E'-support-composition set forth below in example No. | 2 | 3 | 3 | 5 | 6 | 9 | 13 |
| F-aluminum deposited, lb per ream | .3 | .G | 1.5 | 1.0 | 3.0 | 2.0 | .5 |
| Solvent | a | b | b | a | c | b | a |

a-acetone
b-toluol
c-50% acetone, 50% toluol

In each example, suitable platelets as described above were obtained.

The solids content of the combination of solvent and platelets was increased, in each case, to from 70 to 80% by decanting.

Referring now to FIG. 5, a web (indicated generally as 13) of indeterminate length carrying reflective thermally transferable material, usually referred to as reflective hot stamp tape, may be provided in accordance with the invention and may comprise a carrier sheet A provided with release coat D, protective layer G, a reflective or platelet layer H comprising 50 to 80% by weight of the platelets described above and, if desired, adherence coat J.

Figure 6:
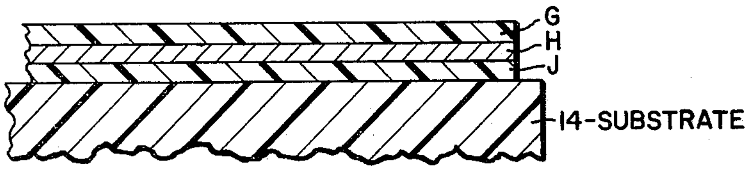
FIG. 6 is a cross-sectional schematic view of the embodiment of FIG. 5 after its application.

Heat as indicated by arrows 10 and pressure as indicated by arrows 11 may be applied to force the laminar assembly 13, consisting of layers A through J as described, against substrate 14. After thus applying heat and pressure, the carrier sheet and layer D attached thereto, may be removed to provide the article of FIG. 6, wherein layer H provides high diffuse reflectance as described below.

Figure 7:
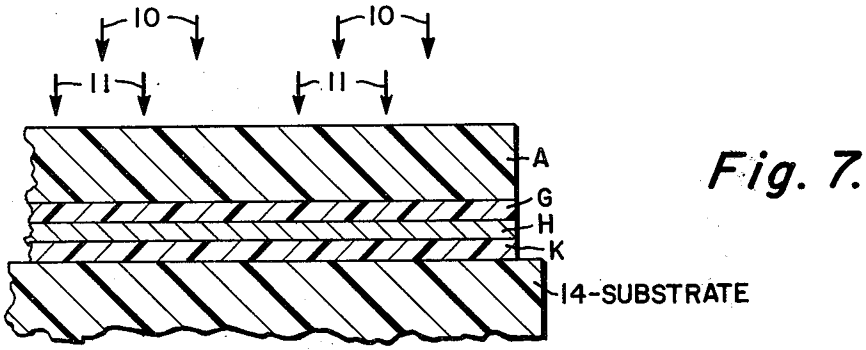
FIG. 7 is a cross-sectional schematic view of another embodiment of the hot stamp tape.
Figure 8:
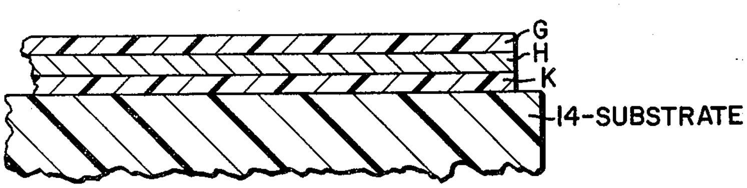
FIG. 8 is a cross-sectional schematic view of the embodiment of FIG. 7 after its application.

In FIG. 7 is shown an embodiment corresponding to that of FIG. 5 wherein layers D and J are omitted, layer G provides a combination release and protective coat, and pigmented layer K is critically provided. In FIG. 8 is shown the article which remains after completing the process of FIG. 7 and removing sheet A. By providng layer K comprising standard aluminum pigment or operably a standard black or white pigment or mixture thereof to provide a gray pigment, a superior article is provided.

All coats or layers may be applied by any suitable coating means such as by gravure printing, Meyer rod or reverse roller coater.

wax, or a mixture of thereof, or a mixture of wax with other substances, may be used; but it is generally a waxy substance characterized by having a softening range rather than a clear softening point. The softening range or softening point of the release coat is generally preferably lower than the melting or softening points of the carrier sheet and all other layers in the laminar assembly so that when subjected to heat the softness of the release coat when heated permits the replicating coat to be release therefrom.

The protective coat is an ultraviolet resistant, transparent, flexible, synthetic resinous material having a thickness of from 0.1 to 0.5 mils. The protective coat may in suitable instances be provided with release properties so that when subjected to suitable heat and pressure during hot stamping it is suitably released from the carrier sheet without the presence of a separate and a distinct release coat.

The purpose of the adherence layer is to promote or improve adherence of the laminar assembly to a substrate, and an adherence coat need be provided only if the adherence is otherwise unsatisfactory.

In Table II, the presence of an X in a column indicates that a coating or layer is present in the example heading the column, and the absence of an X indicates the absence of a corresponding layer.

Table II

| | Example | | | | | | | | | | | | |
|---|---|---|---|---|---|---|---|---|---|---|---|---|---|
| Coat | 1 | 2 | 3 | 4 | 5 | 6 | 7 | 8 | 9 | 10 | 11 | 12 | 13 |
| D release | X | | X | X | | X | | | X | | | | |
| G protective | X | X | X | X | X | X | X | X | X | X | X | X | X |
| H platelet | X | X | X | X | X | X | X | X | X | X | X | X | X |
| J adherence | X | X | | | | | | | | | | | |
| K pigment | | | | X | X | X | X | X | X | X | X | X | X |

Below are given specific examples of suitable formulations for each coating layer together with particular characteristics thereof.

Carrier sheet A, which is preferably in web or tape form, may be a transparent, heat-resistant, flexible, foldable sheet of synthetic resinous material; polyester film such as Mylar. Typical of other suitable materials which may be used are a web of cellophane, or cellulose, acetate or paper. Mylar having a thickness of from ½ mil to 2 mils is preferred.

In Table I are shown the layers present in the various examples.

The release coat is generally preferably of a material such as a wax or the like; either natural wax, paraffin Coat D, Release Coat, parts by weight, 1 to 4 pounds per ream, wet

| | Example | | | | | |
|---|---|---|---|---|---|---|
| | 1 | 2 | 3 | 4 | 6 | 9 |
| petroleum wax, $C_{43}H_{88}$ | 5 | | | .5 | | |
| petroleum wax, $C_{41}H_{84}$ | | 4 | | | | |
| Montan wax | | | 7 | | 5 | |
| ethyl hydroxyethyl cellulose | | | | | | 4 |
| benzene | 95 | 96 | | | 50 | 48 |
| C $Cl_4$ | | | 93 | | 45 | |
| methyl ethyl ketone | | | | | | 48 |
| trichloroethylene | | | | 99.5 | | |

Coat G - Clear Protective Coat, parts by weight

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Union Carbide VYHH vinyl resin | 17 | 12 | | | | | 4 | | 15 | 4 | | | |
| Nitrocellulose ½sec R.S. | | | 18 | 13 | | | | 5 | | | 3 | | |
| Methyl methacrylate, medium molecular wt. | | | | | 20 | 15 | 14 | 12 | | 13 | 14 | 20 | 10 |
| butanol | | | 55 | | | | | 28 | | | | | |
| benzene | 50 | 88 | | 29 | 80 | | 41 | | 85 | 34 | | 80 | 80 |
| acetone | 33 | | 27 | 58 | | 85 | 41 | 55 | | 34 | 66 | | |
| cure time, seconds | 40 | 40 | 30 | 30 | 27 | 25 | 30 | 10 | 10 | 5 | 7 | 10 | 10 |
| cure temp, °F. | 180 | 180 | 200 | 200 | 205 | 200 | 200 | 225 | 230 | 240 | 220 | 215 | 215 |
| coating weights, wet pounds/ream | 30 | 40 | 30 | 45 | 10 | 12 | 15 | 30 | 20 | 20 | 20 | 40 | 45 |

Layer H, Platelet layer, parts by weight

| | Example 1 | 2 | 3 | 4 | 5 | 6 | 7 | 8 | 9 | 10 | 11 | 12 | 13 |
|---|---|---|---|---|---|---|---|---|---|---|---|---|---|
| Platelets from example No. | A | A | B | C | D | E | E | E | E | F | G | G | G |
| Solids content of platelets in solvent, % | 80 | 80 | 70 | 75 | 80 | 80 | 80 | 80 | 80 | 75 | 80 | 80 | 80 |
| Solvent and platelets | 100 | 100 | 100 | 100 | 100 | 100 | 100 | 100 | 100 | 100 | 100 | 100 | 100 |
| Methylmethacrylate | | | | | | 10 | 2 | | 5 | | | 3 | |
| Nitrocellulose 1/2 sec R.S. | | | | | | | | 3 | | | | | |

Coat J - Adherence Coat, parts by weight

| | Example 1 | 2 |
|---|---|---|
| Methyl methacrylate - butyl methacrylate copolymer | 20 | |
| Nitrocellulose, 1/2 sec R.S. | | 15 |
| Tricresyl phosphate | 5 | 6 |
| octyl alcohol | 40 | 40 |
| pentane | 25 | 29 |
| acetone | 10 | 10 |
| cure time, minutes | 2 | 2 |
| cure temp., °F. | 120 | 120 |
| coating weight, wet, lbs./ream | 15 | 50 |

Layer K, Pigment Layer parts by weight (cure at 180°F. to 220°F. for 4 to 20 seconds)

| | Example 4 | 5 | 6 | 7 | 8 | 9 | 10 | 11 | 12 | 13 |
|---|---|---|---|---|---|---|---|---|---|---|
| Methyl methacrylate | 10 | | | 20 | | | 15 | | | 18 |
| Vinyl Chloride resin | | 10 | | | | | | 12 | | |
| Nitrocellulose, 1/2 sec RS | | | | | 9 | 12 | | | | |
| Me methacrylate - Bu methacrylate copolymer | | | 21 | | | | | | 16 | |
| $TiO_2$ | 6 | | 5 | 3 | 4 | | | | | |
| standard commercial aluminum paste | | | | | | 10 | | 7 | 11 | |
| ground aluminum 3000 paste | | | | | | | 12 | | | 13 |
| Carbon black | | 5 | | 2 | 4 | | | | | |
| acetone | | 90 | 50 | 80 | 30 | 30 | 80 | 90 | 20 | 90 |
| benzene | 90 | | | | | | | | 20 | |
| methanol | | | 28 | | 60 | 60 | | | 20 | |
| coating weights, wet lbs./ream | 20 | 25 | 19 | 21 | 22 | 21 | 25 | 21 | 24 | 15 |

The unusual and unique properties of the hot stamp tape made in accordance with the invention are indicated in Table III below showing the diffuse reflectance, measured as the difference between total reflectance and specular reflectance by a Gardner directional reflectometer in accordance with ASTM Method E429-71, Standard Measurement for Reflecting Characteristics Using Integrated Sphere Instruments.

Diffuse reflectance is an indication of the property often referred to as brightness.

Table III

| | Total Reflectance,% | Specular Reflectance,% | Diffuse Reflectance,% |
|---|---|---|---|
| Standard: | | | |
| Gardner brushed aluminum | 71 | 74 | 3 |
| Hot Stamp Tape: | | | |
| standard aluminum paste as sole pigment | 57.7 | 59.4 | 1.7 |
| ground aluminum 3000 paste as sole pigment (brightest known) | 52.7 | 57.7 | 5.0 |
| Example 12 | 52.4 | 70.9 | 18.5 |
| Example 10 | 36.6 | 69.9 | 33.3 |
| $TiO_2$ as sole pigment | 77.2 | 77.8 | .6 |
| vacuum metallized continuous aluminum film | 5.2 | 87.2 | 82.0 |

The diffuse reflectance of the tape of Example 12 is thus more than 3.5 times as great as that of tape made with the brightest aluminum paste known and more than 10 times as great as that of tape made with standard aluminum pigment.

The diffuse reflectance of the tape of Example 10 is close to one-half that of a vacuum metallized film and is over 6.5 times and about 20 times as great as that of tape made with the respective aluminum pastes.

Note that the diffuse reflectance of each individual platelet, as mentioned above, corresponds to the diffuse reflectance of the laminate on the carrier web from which the platelet is made and may be from 75 to 95%.

Further embodiments and variations will be apparent to those skilled in the art and are intended to be included within the scope of the invention.

Having thus described the invention, the claims follow:

We claim:

1. A hot stamp tape comprising a carrier sheet, and a highly reflective and corrosion-resistant transferable layer on one side of the carrier sheet, the transferable layer being releasable from the carrier sheet and being attachable to a substrate in response to heat and pressure, the hot stamp tape being characterized by the combination of:

the carrier sheet comprising a heat-resistant, flexible, foldable sheet of synthetic resinous material, the transferable layer comprising a. a protective layer of a transparent flexible, ultraviolet-resistant synthetic resinous material coated on the carrier sheet, b. a reflective layer coated on the protective layer and comprising 50 to 80% by weight of platelets which include a first lamina of synthetic resinous material, a second highly reflective lamina of aluminum having a thickness of about 0.3 to 3.5 millionths of an inch, each of the platelets having a total thickness of from about 0.0003 to 0.002 inch, and c. a layer of non-platelet aluminum pigment coated on the reflective layer.

2. A hot stamp tape according to claim 1 in which the platelets further include a third lamina of synthetic resinous material to sandwich the second lamina between the first and third laminae.

3. A hot stamp tape according to claim 1 having a diffuse reflectance of from about 15 to 35%.

4. A hot stamp tape according to claim 1 in which the thickness of the protective layer is from 0.1 to 0.5 mils.

5. A hot stamp tape comprising a carrier sheet, and a highly reflective and corrosion-resistant transferable layer on one side of the carrier sheet, the transferable layer being releasable from the carrier sheet and being adherently attachable to a substrate in response to heat and pressure, the hot stamp tape being characterized by the combination of:

the carrier sheet comprising a heat-resistant, flexible, foldable sheet of synthetic resinous material, the transferable layer comprising a. a protective layer of a transparent flexible, ulraviolet-resistant synthetic resinous material coated on the carrier sheet, b. a reflective layer coated on the protective layer and comprising 50 to 80% by weight of platelets which include a first lamina of synthetic resinous material, a second highly reflective lamina of a metal selected from the group consisting of aluminum, gold, copper, titanium, molybdenum, vanadium, cadmium, zinc, tin, nickel, chromium and indium, the second lamina having a thickness of 0.3 to 3.5 millionths of an inch, each of the platelets having a total thickness of from 0.0003 to 0.002 inch, and c. a layer of non-platelet opaque pigment coated on the reflective layer.

6. A hot stamp tape according to claim 5 in which the platelets further include a third lamina of synthetic resinous material to sandwich the second lamina between the first and third laminae.

7. A hot stamp tape according to claim 5 having a diffuse reflectance of from 15 to 35%.

8. A hot stamp tape according to claim 5 in which the thickness of the protective layer is from 0.1 to 0.5 mils.

9. A hot stamp tape according to claim 5 in which the non-platelet opaque pigment layer comprises a material selected from the group consisting of aluminum pigment, a black pigment, a white pigment, and mixtures thereof.

* * * * *

UNITED STATES PATENT AND TRADEMARK OFFICE

CERTIFICATE OF CORRECTION

PATENT NO. : 3,949,139

DATED : April 6, 1976

INVENTOR(S) : Richard E. Dunning et al

It is certified that error appears in the above-identified patent and that said Letters Patent are hereby corrected as shown below:

Col. 2, line 51, "continuously" should read -- continuous --.

Col. 4, Table I, under "B", ".G" should read -- .6 --.

Col. 5, line 19, "providng" should read -- providing --.

Col. 6, line 10, "release" should read -- released --.

Signed and Sealed this

*twenty-ninth* Day of *June 1976*

[SEAL]

*Attest:*

RUTH C. MASON
*Attesting Officer*

C. MARSHALL DANN
*Commissioner of Patents and Trademarks*